Nov. 14, 1950

C. C. POND

EQUALIZER FOR SUPPORTING MAGNETIC RECORDING AND ERASING HEADS

Filed April 25, 1947

2,530,029

INVENTOR
Chester C. Pond
BY
Synnestvedt & Lechner
ATTORNEYS

Patented Nov. 14, 1950 2,530,029

UNITED STATES PATENT OFFICE 2,530,029

EQUALIZER FOR SUPPORTING MAGNETIC RECORDING AND ERASING HEADS

Chester C. Pond, Melrose Park, Pa., assignor to The International Electronics Company, Philadelphia, Pa., a corporation of Pennsylvania Application April 25, 1947, Serial No. 743,806

9 Claims. (Cl. 179—100.2)

Figure 1:
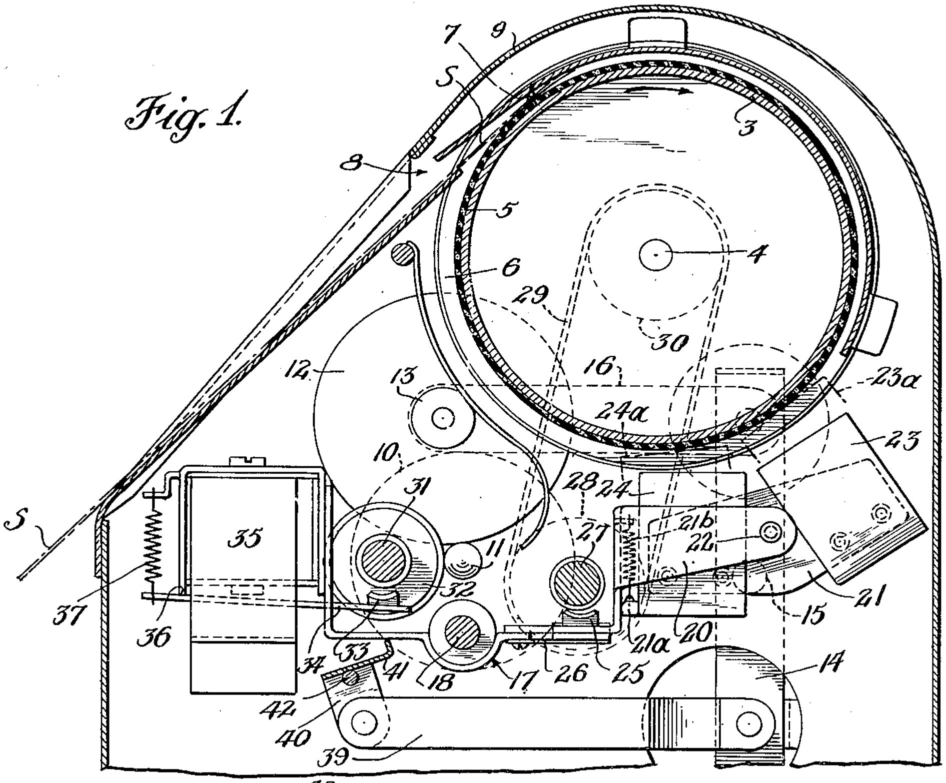

This invention relates to magnetic recording and reproducing equipment, the invention being particularly adapted to a machine for use with flexible rectangular magnetic record sheets. The invention, moreover, is especially concerned with a machine of the type mentioned adapted for office dictation purposes.

Still more specifically, the invention is particularly adapted to that type of office dictation equipment disclosed in copending applications of Bruce Roberts Serial No. 717,754, filed December 21, 1946, and Serial No. 740,653, filed April 10, 1947, in which a rectangular record sheet, advantageously of standard letter size and proportions (e. g. 8½ x 11″) is temporarily wrapped upon a rotatable drum, with opposite edges overlapped, and is scanned for recording or reproduction while so wrapped upon the drum. A record sheet of the type here contemplated for use is one carrying dispersed magnetizable particles, for instance a sheet of paper having a binder or coating on one surface in which the magnetizable particles are dispersed.

The magnetic scanning devices have motion adapted to scan a helical track on the record sheet, with the turns of the helix crossing the lapped edges of the sheet. After making a recording, the recorded intelligence may be transcribed, or the sheet may be removed for subsequent reinsertion for playing back, either in the same or in a similar machine. Upon playback the magnetic head previously used for scanning is adapted to be used as a reproducing head.

As further disclosed in said copending applications it is of advantage in various magnetic recording equipment, and especially in office dictation equipment, to provide for erasure and redictation. even in a piecemeal fashion, in order to enable the making of corrections. For this purpose the record sheet is preferably concurrently scanned, during recording, not only with a magnetic recording head but also with a magnetic erasing head positioned in advance of the recording head, so that during the recording operation any previously recorded intelligence on the magnetic record is obliterated just in advance of the recording of the freshly dictated material.

The primary object of the present invention is to provide a novel mounting mechanism for the recording and erasing heads, in a dictation machine of the type referred to above.

According to the invention the mounting for the recording and erasing heads is arranged to ensure positive and accurate engagement of the heads with the record sheet, notwithstanding the fact that the scanning path crosses the lapped edges of the record, and also despite manufacturing irregularities, such as eccentricity of the record supporting drum. Positive and accurate engagement of the heads with the record is of importance in ensuring effective erasure, as well as accurate and uniform recording and reproduction.

In the preferred embodiment of the invention, the foregoing is achieved by the employment of an equalizer lever or beam carrying the recording head toward one end and the erasing head toward the other end, and having a mounting fulcrum intermediate the two heads. In this way when the mounting fulcrum for the beam is advanced toward the record to bring the recording and erasing heads against the record sheet, both heads are caused to intimately engage the record sheet. Advantageously the mounting fulcrum is located approximately midway between the recording and erasing heads, and means are provided to bias the equalizer lever in a direction providing somewhat greater pressure of control of the recording head with the record than of the erasing head with the record.

How the foregoing and other objects and advantages are attained will appear more fully from the following description referring to the accompanying drawings, in which—

Figure 2:
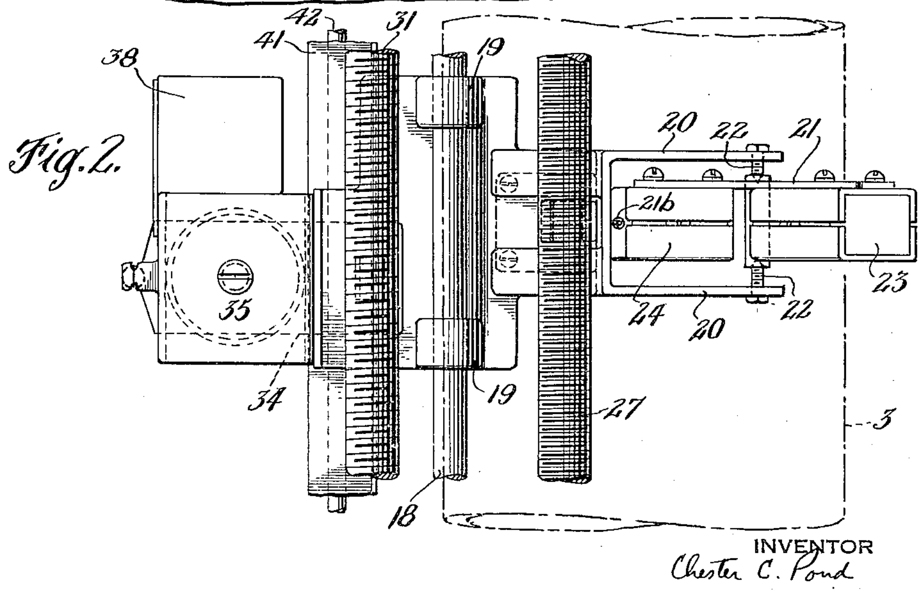

Figure 1 is a transverse sectional vertical view through an office dictation machine of a type disclosed in said copending application Serial No. 740,653, the machine being equipped with the improvements of the present invention; and Figure 2 is a plan view of certain parts shown in Figure 1.

Referring now to the drawing, the machine comprises a rotative drum 3 formed of a nonmagnetic material, such as brass or a resin, the drum being mounted for rotation on an axis 4. The drum carries a resilient surfacing indicated at 5, such surfacing also being disclosed in copending application of Lloyd J. Bobb, entitled Mechanism for Supporting a Magnetic Record Sheet to be Scanned, Serial No. 743,807, filed concurrently herewith. A pair of end flanges, one of which appears at 6 are carried by the drum, these flanges serving as positioning elements for a record sheet wrapped upon the drum. Projecting from the surface of the drum are a pair of hooks one of which is shown at 7 which are adapted to engage in apertures formed in a rectangular record sheet S as the sheet is fed into the machine through the slot 8 provided in the enclosing casing 9. From Figure 1 it will readily be seen that upon rotation of the drum in the direction indicated by the arrow, the sheet S, having been engaged by hooks 7, will be wrapped around the drum.

The drum is adapted to be driven from a motor diagrammatically indicated at 10, having a drive shaft 11 in peripheral engagement with a drive puck 12. The puck 12 also has a friction driving surface 13 adapted to engage with the periphery of the drum flange 6. The drive mechanism as fully disclosed in said copending application Serial No. 740,653 is adapted to be engaged and disengaged by movement of a lever 14 which is pivoted to a fixed part at 15. A link 16 interconnects the upper end of lever 14 with the driving puck and, upon oscillation of lever 14, the surface 13 of the driving puck is engaged with or disengaged from the periphery of the drum flange 6. This lever 14 also serves to engage and disengage the recording and erasing heads from the record sheet on the drum, as will appear herebelow following a description of the mounting of the recording and erasing heads.

A carriage 17 is mounted on an axial guideway 18 by means of sliding bearings 19—19 (see Figure 2). The carriage is also oscillatable about the axis of the way 18. Toward one side of the axial way 18 (toward the right as viewed in the figures) the carriage is provided with a pair of supporting brackets 20—20 between which is mounted an equalizer beam or lever 21, as by pivot elements 22—22. The erasing head 23 and the recording head 24 are both secured to the beam 21, one toward one side of the axis 22—22 and the other toward the other side thereof.

With the arrangement just described, upon upward swinging movement of the right hand arm of the carriage 17, the fulcrum 22—22 for the beam 21 is advanced toward the record supporting drum, thereby bringing the erasing and recording heads against the record on the drum and ensuring accurate engagement. The dotted line positions 23*a* and 24*a* in Figure 1 indicate the heads engaged with a record sheet on the drum.

A stop member 21*a* is mounted on the head 24 in position to engage with a portion of the carriage, in order to prevent excessive downward oscillation of the right hand arm of beam 21 when the heads are not in engagement with the drum. However, this stop 21*a* is so located as not to interfere with the desired intimate engagement of both heads with the drum when the fulcrum 22 is moved upwardly.

A tension spring 21*b* acts to prevent chattering by retaining the stop 21*a* against the carriage when the heads are not in engagement with a record. With reference to the action of spring 21*b* it is further pointed out that the invention contemplates providing a somewhat greater contact pressure of the recording head 24 with the record than the contact pressure of the erasing head 23. For this purpose the location of the fulcrum 22 or the weighting of the two arms of the equalizer lever may be such as to provide a gravity bias acting in favor of the recording head. Spring 21*b* will also serve this biasing function.

The carriage also serves to support the half-nut 25 which is yieldingly mounted on the carriage by means of a spring 26, the half-nut being positioned to engage lead screw 27 which is driven by a sprocket 28 with which chain 29 cooperates, the chain also passing over a sprocket 30 fixed on the mounting shaft 4 of the drum.

A reverse lead screw 31 is also provided, this lead screw having a friction driving disc 32 in constant engagement with the motor shaft 11. This reverse lead screw is adapted to be engaged by a half-nut 33 carried by the armature 34 of a solenoid 35 which is secured to the left hand arm of the carriage 17 in position to counterweight the action of gravity on the erasing and recording heads on the right hand arm of the carriage. Armature 34 is arranged to pivot about an edge 36, being biased to disengage the half-nut 33 by means of a spring 37. With the carriage in position shown in full lines in Figure 1, the solenoid 35 may be energized, to thereby engage the half-nut 33 with the lead screw 31, and in this way cause backspacing or reverse movement of the carriage along the axial way 18.

At its left end the carriage further supports a counterweight 38 (see Figure 2), and the mass of all of the parts mounted on the carriage is so distributed that the action of gravity tends to lower the left hand end of the carriage, thus raising the right hand end and thereby bringing the erasing and recording heads into engagement with a record sheet on the drum. Oscillation of the carriage in the opposite direction to disengage the erasing and recording heads from the drum is effected by means of a link 39 which is pivotally connected with the controlling lever 14 and also with an arm 40 of a bar 41 which extends parallel to the axial way 18, so that it may engage the carriage at any axial position thereof. This bar 41 is pivotally mounted by means of a rod 42, so that upon movement of the link 39 to the right as viewed in Figure 1 the bar 41 is raised so as to engage the underside of the carriage, to the left of the axial way 18, thereby lifting the left end of the carriage and lowering the right end thereof. This brings the erasing and recording heads out of engagement with the drum (the full line position of Figure 1).

It is pointed out that various parts of the controls for the drum drive and for oscillating the carriage form no part of the present invention per se, in view of which they are only briefly disclosed herein. For additional disclosure thereof reference may be made to the copending application Serial No. 740,653, above referred to.

However, from the above it will be seen that the control arm 14 provides for coordination of various control functions, oscillation of this arm in one direction concurrently engaging the drum drive and permitting the erasing and recording heads to engage the drum, and oscillation of the control arm in the opposite direction concurrently disengaging the drum drive and disengaging the erasing and recording heads from the drum. Since the half-nut 25 engages the lead screw 27 when the magnetic heads are in contact with the drum, the carriage is at that time moved along the axial way 18, and in this way a helical track is scanned upon a record sheet carried by the drum.

For purposes of redictation of a portion of the material recorded on a record, the solenoid 35 is energized to thereby "backspace" the carriage (the magnetic heads being at this time out of engagement with the record). When the point is reached at which it is desired to correct or redictate, the control arm is again actuated to drive the drum and bring the erasing and recording heads into engagement with the record, whereby the previously recorded material is obliterated by the erasing head, and, concurrently, revised or corrected intelligence may be recorded by the recording head.

As is disclosed in the copending applications above referred to provision is preferably made for employment of the recording head not only for recording purposes but also for playback, as a reproducing head. However, mechanism for this purpose forms no part of the present invention per se and therefore need not be fully disclosed herein. It may here briefly be mentioned that in effecting redictation or correction, a machine equipped as described will enable the user to backspace and then play back a selected portion of the recorded material so that he may accurately determine the point at which to begin redictation. Upon reaching that point the controls are adjusted to recondition the recording head for recording purposes, and the desired correction is then made. It is also mentioned that the erasing head is de-energized at the time the recording head is being used for playback.

According to the foregoing the invention provides a novel mounting arrangement for the erasing head and the recording and reproducing head, the mounting being such as to ensure intimacy of engagement of the magnetic heads with the record sheet on the drum, notwithstanding manufacturing inaccuracies either in the shape of the drum or in other parts, and notwithstanding the fact that, during the scanning, the erasing and recording heads successively cross over the lapped edges of the record sheet. The employment of the head mounting of the present invention is especially effective when used in association with a drum carrying a resilient surfacing such as shown at 5. The combination of these two features ensures maximum uniformity and intimacy of engagement of the magnetic heads with the record sheets of the flexible character which it is contemplated to employ.

I claim:

1. In a machine for use with magnetic records, a backing member adapted to support a record during scanning, a pair of magnetic scanning heads adapted to engage a record so supported and positioned to sequentially scan a single path on the record, a mounting for said heads comprising a lever having a fulcrum between the heads and means for resiliently urging said heads against the surface of a record, and additional resilient means urging the trailing head against the record with greater pressure than the leading head.

2. For apparatus comprising a support for a record to be magnetically scanned and two magnetic heads adapted to yieldingly engage a record on the support at points separated in the direction of scanning, an improved head mounting comprising a lever extending generally parallel to the direction of scanning, a first head secured to the lever, a second head secured thereto and spaced from the first head in the said direction, a main head supporting element mounted for movement toward and away from the support, and linkage interconnecting said element and said lever for urging said heads into engagement with a record on the support with greater pressure on one of said heads than on the other when the element is moved toward the support.

3. A construction in accordance with claim 2 in which the head which is urged against the record with the greater pressure is the trailing head.

4. A construction in accordance with claim 3 in which the trailing head is a recording head and the other head is an erasing head.

5. In apparatus comprising a support for a record to be magnetically scanned and two magnetic heads adapted to yieldingly engage a record on the support at points separated in the direction of scanning, an improved head mounting comprising main head supporting means yieldingly urged toward a record on said support, a lever secured thereto with freedom for oscillatory movement on an axis generally normal to the direction of scanning, a first head secured to the lever on one side of said axis, a second head secured to the lever on the other side of said axis, and a resilient device imposing a torque moment on said lever about said axis in a sense to urge said first head against a record on the support with a greater pressure than the pressure on said second head.

6. A construction in accordance with claim 5 in which said first head trails said second head in the scanning sense.

7. A construction in accordance with claim 6 in which said first head is a magnetic recording head and said second head is a magnetic erasing head.

8. In dictation equipment comprising a support for a record to be magnetically scanned and two magnetic heads adapted to yieldingly engage a record on the support at points separated in the direction of scanning, an improved head mounting comprising a main head support adapted to be yieldingly urged against a record on the support during periods of dictation and adapted to be shifted away from the support between such periods, a lever secured to said main head support with freedom for oscillatory movement about an axis normal to the plane of shifting, a head secured to said lever on each side of said axis, means imposing a torque moment about said axis in a sense to urge one end of said lever toward said record support with a greater pressure than the other end, and means limiting movement of said end to a range such that both heads engage the record during periods of dictation and neither head engages the record between such periods.

9. A construction in accordance with claim 8 in which said first means comprises a resilient device reacting between said lever and said main head support.

CHESTER C. POND.

REFERENCES CITED

The following references are of record in the file of this patent:

UNITED STATES PATENTS

| Number | Name | Date |
|---|---|---|
| 788,790 | Pederson | May 2, 1905 |
| 898,283 | Stuart | Sept. 8, 1908 |
| 1,638,999 | Hornauer | Aug. 16, 1927 |
| 1,886,856 | Warwick | Nov. 8, 1932 |

FOREIGN PATENTS

| Number | Country | Date |
|---|---|---|
| 541 | Great Britain | Jan. 8, 1904 |